Dec. 29, 1970  W. C. KERKER  3,550,349
BUNDLING MACHINE

Filed Feb. 19, 1968  16 Sheets-Sheet 1

INVENTOR
WILLIAM C. KERKER
BY
Kane, Dalsimer, Kane, Sullivan & Smith
ATTORNEYS

INVENTOR
WILLIAM C. KERKER
BY
ATTORNEYS

Dec. 29, 1970  W. C. KERKER  3,550,349
BUNDLING MACHINE
Filed Feb. 19, 1968  16 Sheets-Sheet 3

INVENTOR
WILLIAM C. KERKER
BY
Kane, Dalsimer, Kane, Sullivan + Smith
ATTORNEYS

Dec. 29, 1970 W. C. KERKER 3,550,349
BUNDLING MACHINE

Filed Feb. 19, 1968 16 Sheets-Sheet 10

INVENTOR
WILLIAM C. KERKER
BY
Kane, Dalsimer, Kane, Sullivan & Smith
ATTORNEYS

Dec. 29, 1970   W. C. KERKER   3,550,349
BUNDLING MACHINE

Filed Feb. 19, 1968   16 Sheets-Sheet 11

INVENTOR
WILLIAM C. KERKER
BY
Kane, Dalsimer, Kane, Sullivan & Smith
ATTORNEYS

United States Patent Office 3,550,349
Patented Dec. 29, 1970

3,550,349
BUNDLING MACHINE
William C. Kerker, Yonkers, N.Y., John J. Breen, Public Administrator of the estate of said William C. Kerker, deceased, assignor to Potdevin Machine Company, Teterboro, N.J., a corporation of New York
(Filed under Rule 47(b) and 35 U.S.C. 118)
U.S. Cl. 53—124                                    15 Claims

ABSTRACT OF THE DISCLOSURE

This disclosure is directed to a paper bag bundling machine adapted to remove and stack individual bags produced by a bag-making machine and thereafter convey stacks to a station at which the stacks are superimposed one upon the other and compressed to form a bundle which is adapted to be banded to retain the compressed condition and subsequently wrapped.

BACKGROUND OF THE INVENTION

This invention relates to a bundling machine and, more particularly, to a machine for bundling paper bags and other products as well as envelopes, newspapers, magazines and the like.

Paper bags are generally consumed in relatively large numbers and, consequently, must be supplied to vendors in considerable quantities. Naturally, products of this type are considered bulky and when packaged in bundles both for shipment and storage, an unusually excessive amount of space is taken-up notwithstanding the relative lightness in weight of the bundle. With this in mind, there has been a great demand and need for bundling apparatus and techniques for paper bags capable of producing a compact and compressed bundle that will occupy only a minimum amount of space. Several attempts have been made to construct, develop and distribute bundling machines of this type. These machines, however, have failed or been ineffective for one reason or another.

SUMMARY OF THE INVENTION

It is, therefore, a principal object of this invention to provide a bag-bundling machine that has satisfied the needs and demands of the trade and one which is capable of efficiently bundling, in compressed condition, a plurality of paper bags while being coupled directly to the discharge end of a bag-making machine.

Another object is to provide a bag-bundling machine of this type in which improved mechanisms are incorporated; for removing and stacking the individual bags produced by the bag-making machine; for lifting the prescribed stacks of bags; for rotating alternate stacks in order to alternate the location of the bag bottoms in relation to the bag tops; for conveying the alternately arranged stacks and while being conveyed, the stacks are adapted to be compressed to remove any entrapped air; for lifting the stacks to an elevated position; for compressing the stacks to a prescribed volume following the accumulation of a predetermined number of stacks; and for applying a wrapping band to the compressed stacks to form a bundle which is adapted to be subsequently wrapped.

The aforenoted objects and advantages, among others, are effectively attained by the paper bag bundling machine of this invention which is adapted to be coupled directly to the discharge end of a paper bag-making machine. As the individual bags are completed and transferred to the discharge station of the bag-making machine, they are picked off and stacked. When a prescribed number of bags have been accumulated in the stack, the stack is lifted and transferred onto a turntable which is adapted to rotate and orient one stack in one direction and the subsequent stack in a reverse direction, etc., so that the bag bottoms of alternate stacks are opposed to the open top ends of adjacent stacks. In this manner, when the stacks are subsequently bundled, a more uniformly dimensioned bundle is obtained. The stacks are pushed onto a pocket conveyor on which the stacks may be ejected for testing purposes and also compressed to remove any entrapped air therefrom. The compressed stacks are transferred to an elevator which lifts the stacks at which they are retained on supports. When a predetermined number of stacks has been accumulated thereon, they are lifted as a bundle and immediately thereafter compressed so that the bundle occupies a reduced and prescribed volume. The compressed bundle is then pushed to a banding station at which a band of material is wrapped around the compressed bundle in an improved manner to assure the retention of the compressed condition of the banded bundle.

BRIEF DESCRIPTION OF THE DRAWINGS

In the accompanying drawings.

DESCRIPTION OF THE PREFERRED EMBODIMENTS

GENERAL DESCRIPTION

Figure 1:
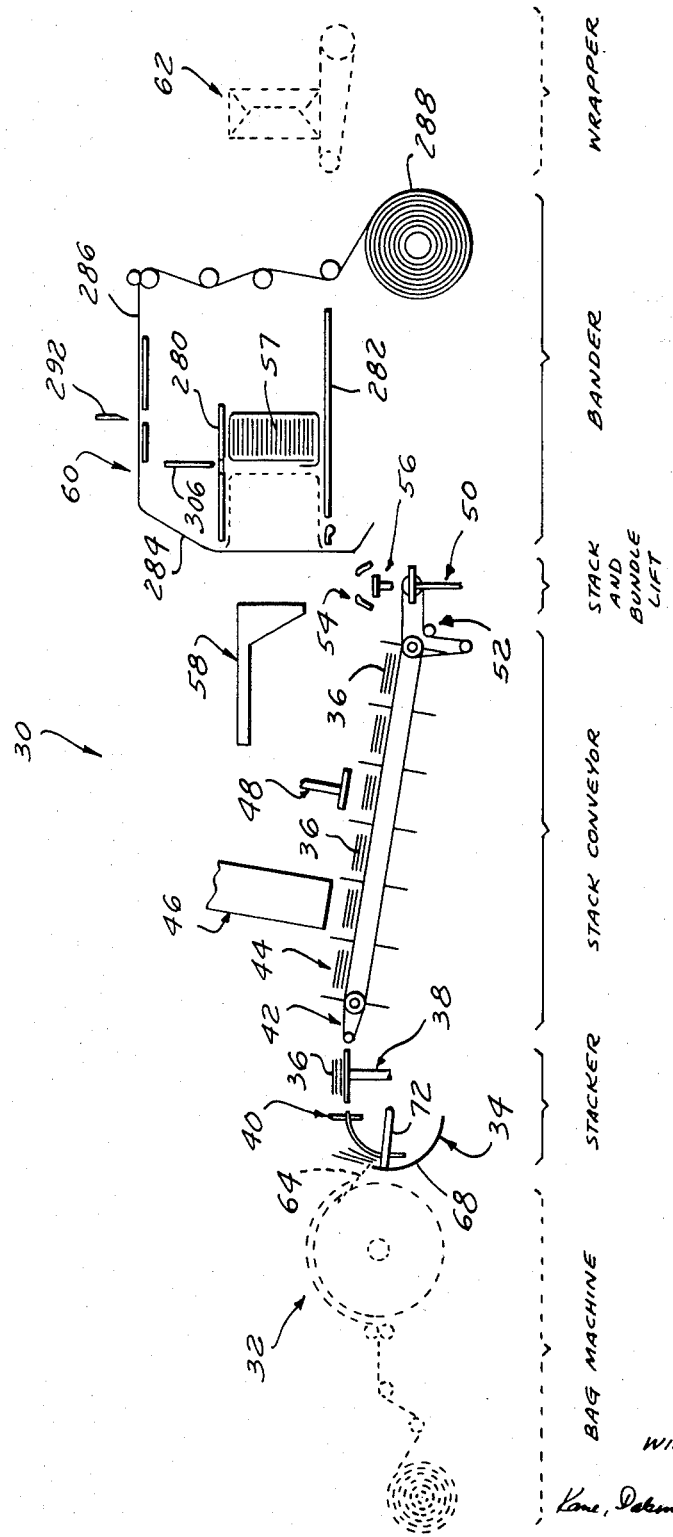
FIG. 1 is an overall schematic view of the paper bag-bundling machine shown associated with the paper bag-making machine at its leading end and a banded bundle wrapping machine at its discharge end.
Figure 2:
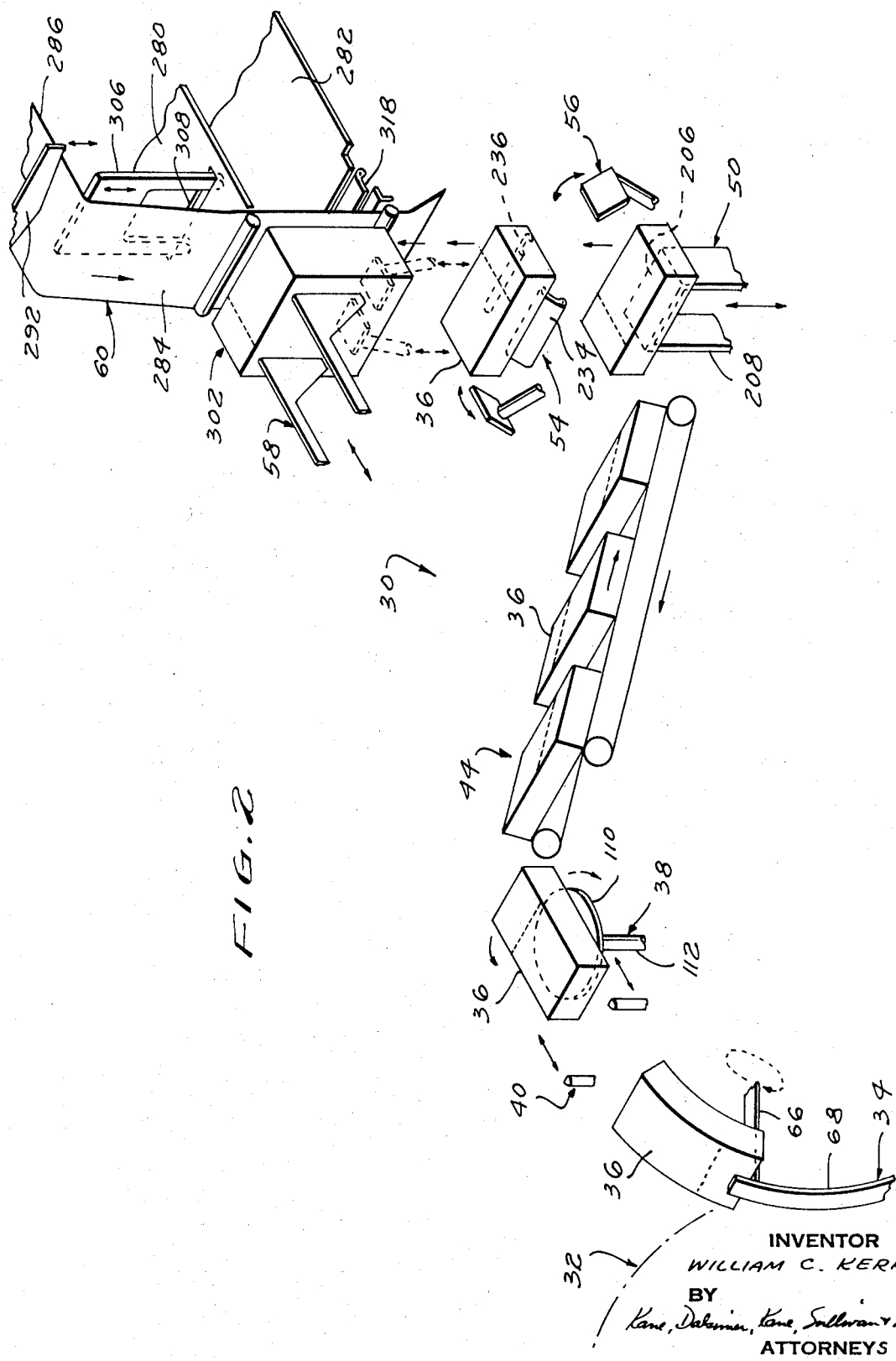
FIG. 2 is an enlarged schematic view in perspective of the paper bag-bundling machine with certain parts removed for clarity.
Figure 3:
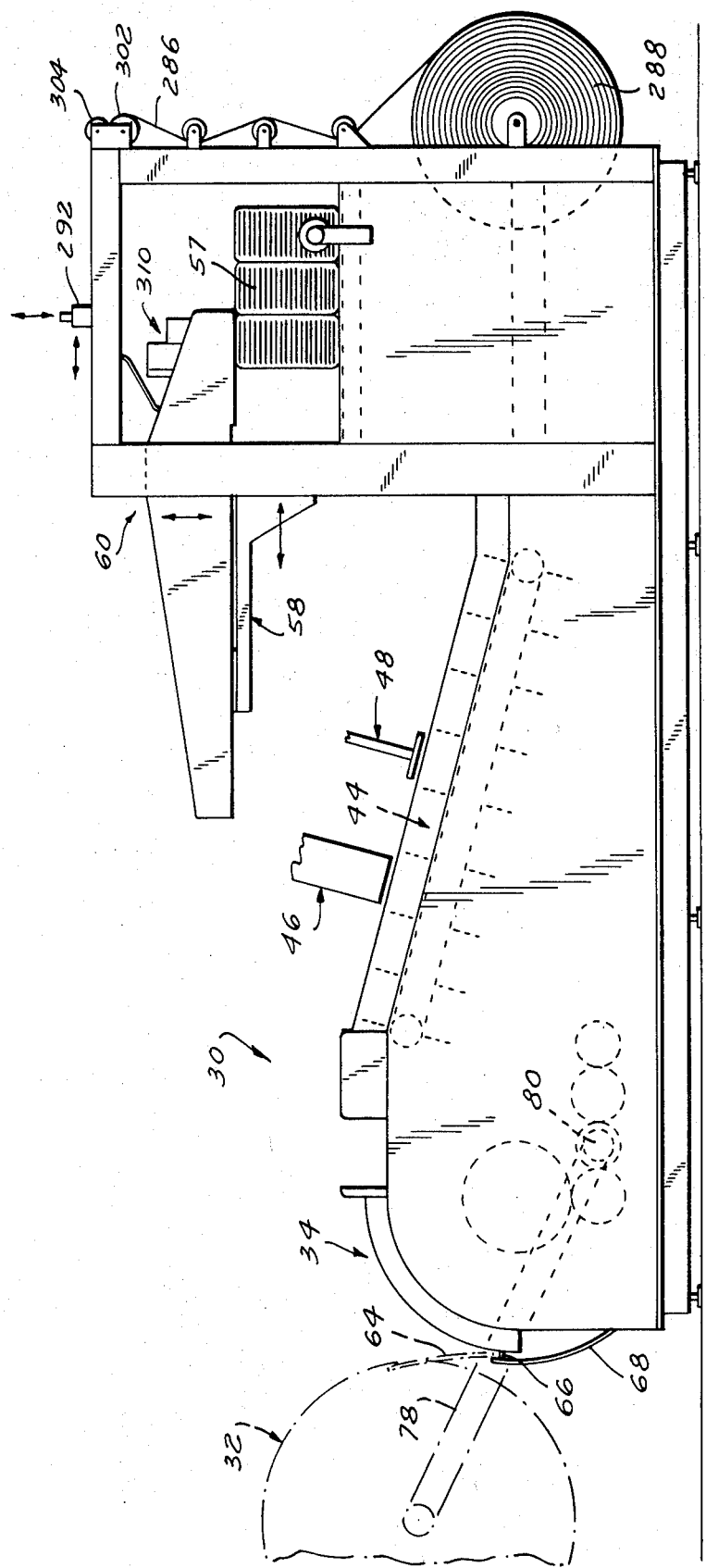
FIG. 3 is a side elevational view of the bag-bundling machine.

In the drawings, a paper bag-bundling machine 30 is coupled with a paper bag-making machine 32 and is provided with a stacker 34 which operates to remove and stack the bags as they are produced by the bag-making machine 32. When a predetermined number of bags are stacked, a lifting mechanism of the stacker 34 lifts and transfers the stack 36 onto a turntable 38. The turntable 38 is adapted to orient alternate stacks such that the bag bottoms are opposite the open top ends of the bags of adjacent stacks. A pusher mechanism 40 pushes the properly oriented stack 36 onto a transfer belt conveyor 42 following which the stack is picked up by a pocket conveyor 44. Where desired, the stacks may be ejected from the individual pockets of the conveyor 44 for inspecting by means of the stack ejector mechanism 46. In addition, while on the pocket conveyor 44, the individual stacks 36 may be compressed to remove any entrapped air therefrom by means of the compressing mechanism 48. At the discharge end of the pocket conveyor 44, the stacks 36 are transferred onto the platform of the stack lifting or elevator mechanism 50 by means of the transfer belt conveyor 52. The stacks are elevated by the stack elevator 50 to an elevated stack supporting mechanism 54 on which a predetermined number of stacks are accumulated. Upon the accumulation of a predetermined number of stacks for constituting a prescribed bundle, a bundle lifting mechanism 56 lifts the accumulated stacks and, at the same time, compresses them. Thereafter, a bundle pusher mechanism 58 pushes the compressed bundle to a bundle banding station 60 at which a band is applied around the compressed bundle to retain the bundle in this condition. The banded bundle may thereafter be transferred to a banded bundle wrapping station at which the banded bundle is suitably wrapped.

PAPER BAG-MAKING MACHINE

The paper bag-making machine 32 may assume any one of a number of different forms well-known to the art. For example, the paper bag-making machine 32 may be of the type disclosed in commonly assigned U.S. Pat. No. 3,172,342, granted on Mar. 9, 1965. This machine 32 is commercially available and operates to progressively transform a web of sheet material such as paper into tubing having bellowed sides. Tubing is periodically notched, slit and then severed into predetermined lengths. The bottoms of the bags are then formed to form bags of predetermined length.

BAG STACKER

The bagstacker 34 strips the individual bags as they are formed by the making machine 32 and accumulates them in a stacked arrangement. In accordance with commercial practice, the bags are arranged in stacks of twenty-five. Towards this end, the bag-stacker 34 includes a bag-stripper 64 which could very well be taken to be part of the bag-making machine 32. When the twenty-fifth bag has been stripped, the prescribed bag stack 36 is lifted onto the turntable 38. During this transfer the stack is isolated and separated from subsequent bags. The stacker 34 includes a bundle lifting plate 66 which is slightly retracted at the start of the lifting cycle and which isolates and moves the stack 36 from the position illustrated in FIG. 4 directly onto the turntable 38. During this movement of the lifting plate 66 as well as its return to the starting position of FIG. 4, the paper bags stripped from the bag-making machine 32 will be accumulated on the outer arcuate face of the curved plate 68 which will, at all times, be disposed between the bag-stripping plate 64. The movement of the lifting plate 66 is timed such that it will assume its starting position of FIG. 4 at about the time that the twenty-fifth bag is stripped from the bag-making machine 32 to form the complete stack 36.

Figure 4:
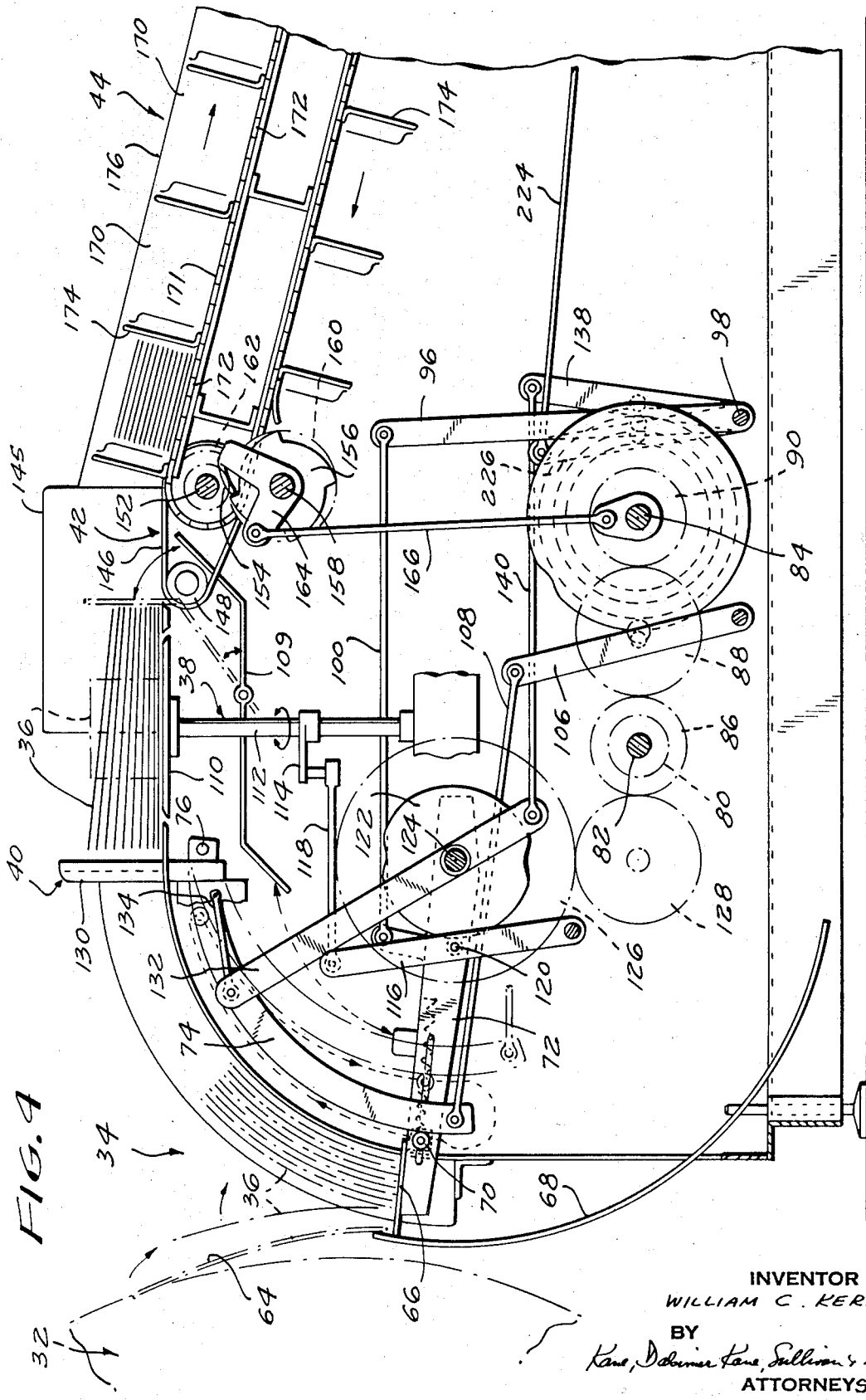
FIG. 4 is an enlarged fragmentary side elevational view of the paper bag pick-off or stripper and stacker, the stacker turntable, and pocket conveyor for transferring the alternated stacks together with the drive mechanism therefor.
Figure 5:
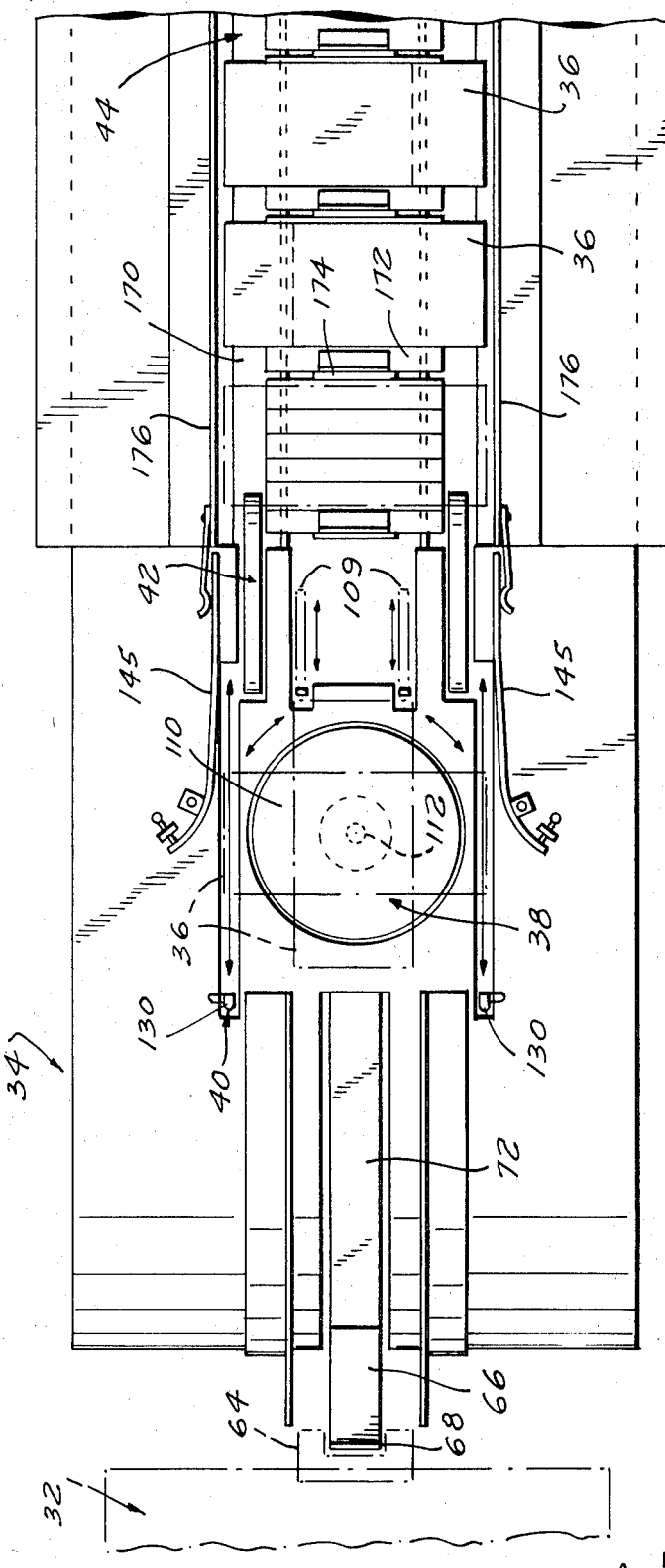
FIG. 5 is a fragmentary top plan view of the stations of FIG. 4.

During the return movement of the lifting plate 66, provision is made for the retraction inwardly of this plate 66 so that it does not interfere with the bag collection process or disrupt the stack of bags being formed. Towards this end, the plate 66 is connected with a cam follower 70 both of which are shiftably mounted on the lifter arm 72 and are spring biased towards the other end of the lifter arm. In this manner, the cam follower 70 is adapted to follow and maintain contact with a pivoting lifter cam 74. The disposition of this cam during the lifting part of this cycle of the plate 66 is shown in FIG. 4. However, during the lifting plate retraction part of the cycle, the cam 74 pivots inwardly about the fixed pivot 76 to enable the plate 66 to shift inwardly because the cam follower 70 is obliged to follow the retracted cam 74 under the influence of its biasing spring. As the plate 66 approaches the starting position, the cam 74 is pivoted outwardly to the position shown in FIG. 4 at which time the plate 66 is adapted to receive the stack of twenty-five bags.

The movement of the parts of the stacker 34 is synchronized with the operation of the bag-making machine 32. In a successful application of the invention, the drive of the stacker 34 was taken directly from the machine 32 in a 14:25 ratio by means of the chain 78 and sprocket wheel 80 which drives the suitably journaled shaft 82. Shaft 84 is, in turn, driven by means of the interposed gear train which comprises gear 86 mounted on shaft 82, rotatably mounted gear 88 and gear 90 mounted on shaft 84. Shaft 84 is suitably journaled and has keyed thereto lifter arm cam 92. The periphery of cam 92 includes a cam track which is followed by means of the cam follower 94 extending from arm 96 the base of which is journaled on shaft 98. The top of the arm 96 is linked to lifter arm 72 by arm 100. The rotation of the cam 92 is such that when the twenty-fifth bag is stacked on the platform 66, a raised portion of the cam track will cause the arm 96 to pivot in a clockwise direction, as viewed in FIG. 4, causing the lifter arm 72 to pivot in a similar direction about its shaft to thereby lift the twenty-five bags onto the platform of the turntable 38.

As stated in the above, the inwardly and downwardly biased bag platform 66 is retracted during the return of the arm 72 in order not to interfere with the bags now being discharged and stripped from the bag-making machine 32. This is accomplished by pivoting the cam 74 in a counterclockwise direction about the fixed pivot 76. Towards this end, a cam 102 is mounted on the shaft 84, the cam track of which is followed by means of a cam follower 104 projecting from the arm 106. The base of this arm 106 is pivotally mounted and the top is linked to the free end of cam 74 by means of the arm 108. In this manner, the cam 74 will pivot about its fixed pivot point 76 when the cam follower 104 traverses the recessed portion of the slotted cam track of cam 102 during the retraction of the lifter arm 72 to cause the pusher plate 66 to shift away from the stripper 64.

In order to assure the desired stacked relationship of the stack 36 on the platform of the turntable 38, the stack finger 109 is pivoted in a counterclockwise direction, as viewed in FIG. 4, as a result of the engagement therewith of projecting surface on the lifter arm 72. During the return of the lifter arm 72, the arm disengages finger 109 and returns it to its normal position, as viewed in FIG. 4.

TURNTABLE

When the stack 36 of bags is lifted onto the platform 110 of the turntable 38, the stack is turned 90° in one direction and then 90° in the other after the dwell between stack transfer in order that alternate stacks will be 180° out of phase so that the ultimately assembled bundle will take up a minimum amount of space. The platform 110 is mounted on a suitably journaled shaft 112. This shaft 112 will turn 90° one way and then 90° the other way for each succeeding cycle by the operation of a crank mechanism including the crank arm 114 keyed to the shaft 112. This arm 114 is linked to arm 116 by means of a link 118. This arm 116 has is lower end pivotal and also includes a cam follower 120 which is adapted to ride the cam slot of cam 122 mounted on a suitably journaled shaft 124. This shaft is rotated by being rotatably coupled with gear 86 through gears 126 and 128. Thus, the operation of the turntable 38 is synchronized with that of the lifter mechanism 34 such that following the deposit of the stack 36 of bags on the turntable platform 110, the cam 122 will cause the arm 116 to actuate the crank 114 through interposed link 118 to turn the shaft 112 and, consequently, the turntable 38 one way and then the other through an arc of 90° to properly orient the stack 36.

PUSHER MECHANISM

Figure 6:
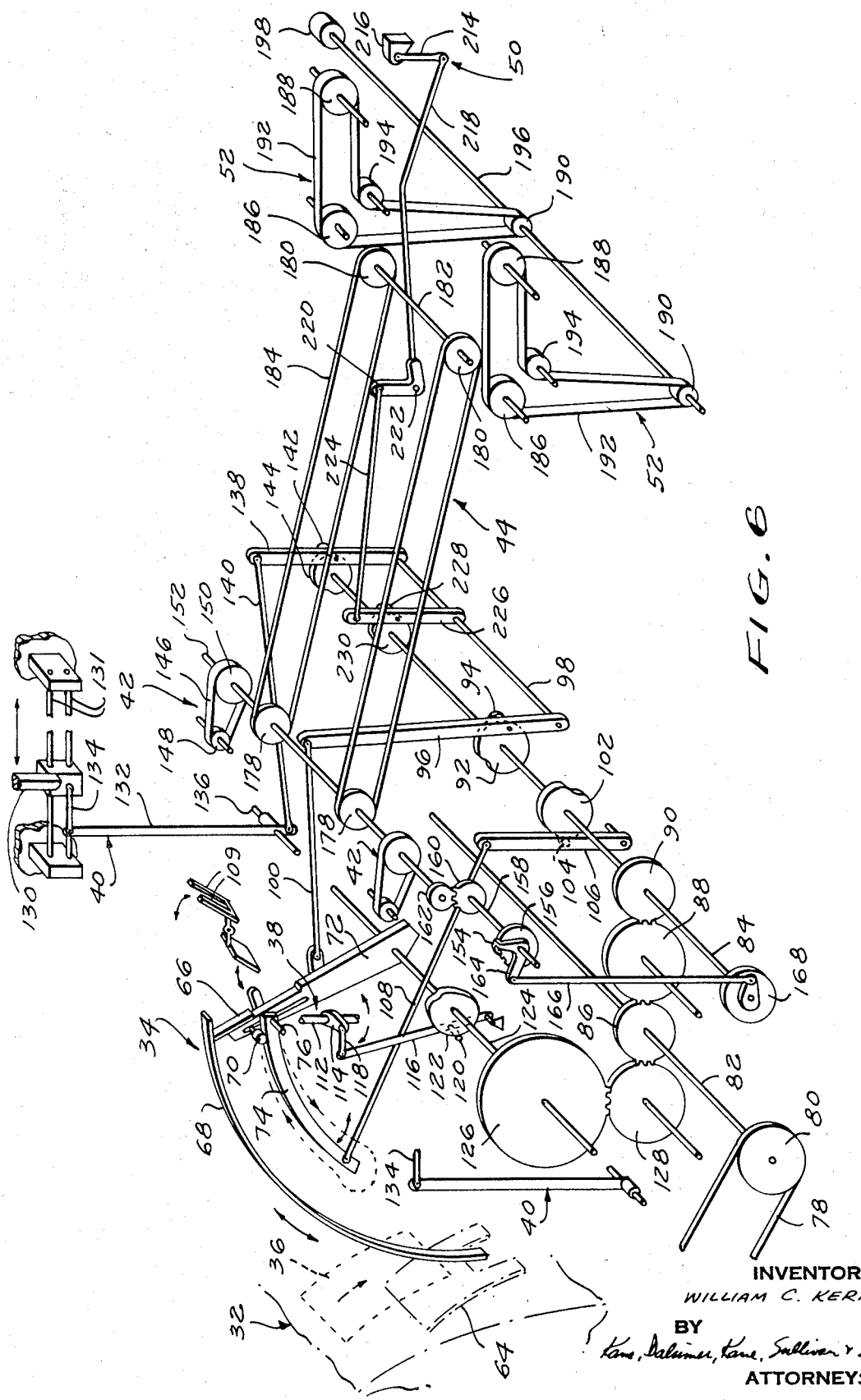
FIG. 6 is a schematic and perscpective view of a representative drive system of the bag bundling machine of a successful embodiment of the invention.

The properly oriented stack 36 on the platform 110 of the turntable 38 is then adapted to be shifted onto the pocket conveyor 44 following placement on the transfer belt conveyor 42 by the pusher 40. The pusher mechanism 40 includes a pusher arm 130 which is suitably linked with arm 132 through link 134 such that when the pusher 130 is actuated to shift the stack 36 onto the transfer belt conveyor 42, the pusher will remain in an upright position throughout the entire cycle of movement. This may be accomplished by having pusher 130 forming part of a block which travels on rails 131, as shown in FIG. 6. This arm is biased in a direction towards the turntable 38 and is pivotal adjacent its lower end on shaft 136 and is linked at this end to the top of arm 138 by interposed link 140. The lower end of arm 138 is pivotally mounted on fixed shaft 98. A cam follower 142 rides in the slotted cam track of cam 144 keyed to shaft 84. Thus, when the cam follower 142 encounters a recessed portion of the cam track of cam 144, the pushers 130 will be actuated in a forward direction towards the turntable 38 to shift the supported stack 36 onto the transfer belt conveyor.

The spring biased and weighted plates 145 tend to jog the stack 36 and even the bags upon transfer therebetween by pusher 30.

Where desired and as shown, a pair of identical pusher mechanisms 40 may be provided.

FIRST TRANSFER BELT ASSEMBLY

The transfer belt assembly 42 receives the stack 36 that is pushed off of the turntable 38 by the pusher 40 and transfers this stack into one of the pockets of the pocket conveyor 44. This conveyor is intermittently operated and includes a belt 146 mounted on a rotatably supported pulley 148 and pulley 150 keyed to shaft 152.

Where desired and as shown, two identical transfer belt conveyors 42 may be provided.

A shaft 152 is intermittently actuated by means of a pawl and ratchet mechanism in which a pawl 154 cooperates with the ratchet wheel 156 to rotate shaft 158 and consequently the intermeshed gears 160 and 162. The pawl 154 is actuated by having its arm 164 coupled with crank 166 the lower end of which is pivotally mounted on a wheel 168 which, in turn, is keyed to rotatably driven shaft 84. With each complete rotation of the wheel 168, the pawl 154 traverses one tooth of the ratchet wheel 156 to cause its rotation and the consequent ultimate rotation of the belt 146 a sufficient amount to cause complete transfer of the stack 36 received thereby by means of the operation of the pusher mechanism 40 and transfers this stack into one of the pockets of the pocket conveyor 44.

POCKET CONVEYOR

The pocket conveyor 44 is also intermittently operated and during each pause in its course of movement, is adapted to receive at its leading end a stack 36 of bags transferred thereto by means of the transfer belt conveyor 42. The details of the pocket conveyor 44 do not necessarily form part of this invention; and it will prove sufficient to say that the conveyor 44 is broken down into a number of pockets 170 defined by the conveyor surface which may comprise hingedly connected flights 172 and upstanding angle members 174 connected with the conveyor surface and a pair of spaced stationary side plates 176. The conveyor surface 171 extends around a pair of pulleys which constitute one of a pair of such pulleys. One of the pulleys 178 is mounted on the intermittently driven shaft 152 whereas the other pulley 180 is mounted on shaft 182. Belt 184 extends over both of the pulleys 178 and 180 for purposes of transferring the intermittent drive. In this manner, the pocket conveyor 44 moves a unit distance determined by the spacing between the adjacent angle members 174. This motion of the pocket conveyor 44 is simultaneous with the movement of the transfer belt conveyor 42 and the second transfer belt conveyor 52 onto which the stacks 36 are transferred at the trailing end of the pocket conveyor 44.

Incidental to the pocket conveyor 44 may appear a stack ejection mechanism 46 for ejecting stacks 36 periodically for testing or other quality control purposes. Similarly, a compressor mechanism 48 may be periodically operated in a synchronized manner with the operation of the conveyor 44 for compressing the stacks 36. Compression is desirable to squeeze air from bags and press and compact stacks for subsequent ease of final compression at beginning of banding station 60. This mechanism 48 may be operated in a number of different ways and by different systems including a hydraulically actuated system.

SECOND TRANSFER BELT CONVEYOR

The second transfer belt conveyor 52 is adapted to receive the stacks 36 discharged by the pocket conveyor 44 and then transfer this stack onto the awaiting platform of the stack lifter mechanism 50. This conveyor 52 may, as shown, comprise a pair of identical assemblies which include rotatable pulleys 186, 188 and 190 over which belt 192 is placed. Idler pulley 194 is also present for taking up slack in the belt 192. It will be noted that pulleys 190 are keyed to shaft 196 coupled with a motor 198. In this manner, the conveyor 52 is constantly rotated for transferring a stack 36 of bags from the trailing end of the pocket conveyor 44 onto the stack lifting mechanism 50.

STACK ELEVATOR

Figure 7:
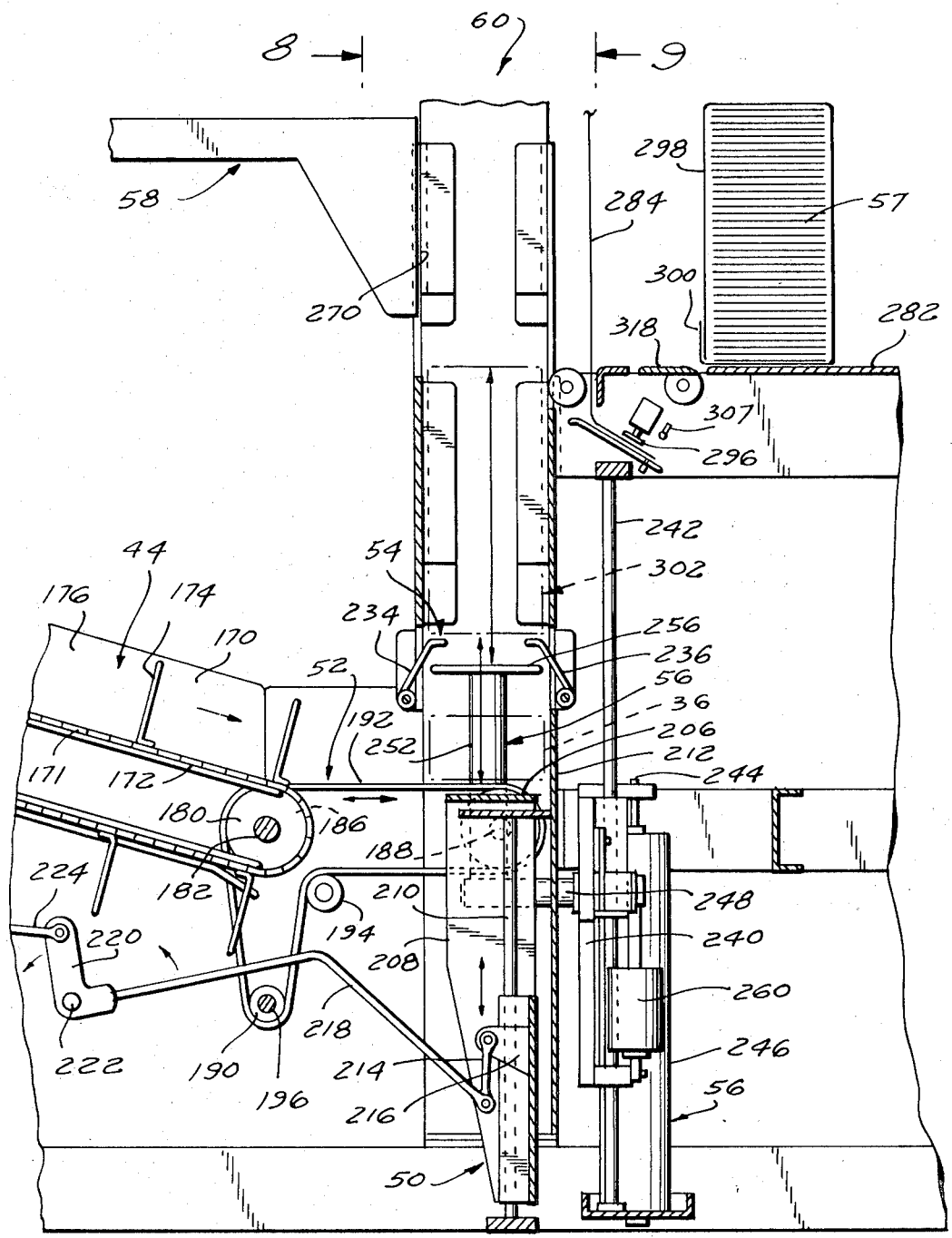
FIG. 7 is an enlarged fragmentary elevational view of the trailing end of the pocket conveyor, stack lifter, bundler lifter, bundle pusher and banding station.
Figure 8:
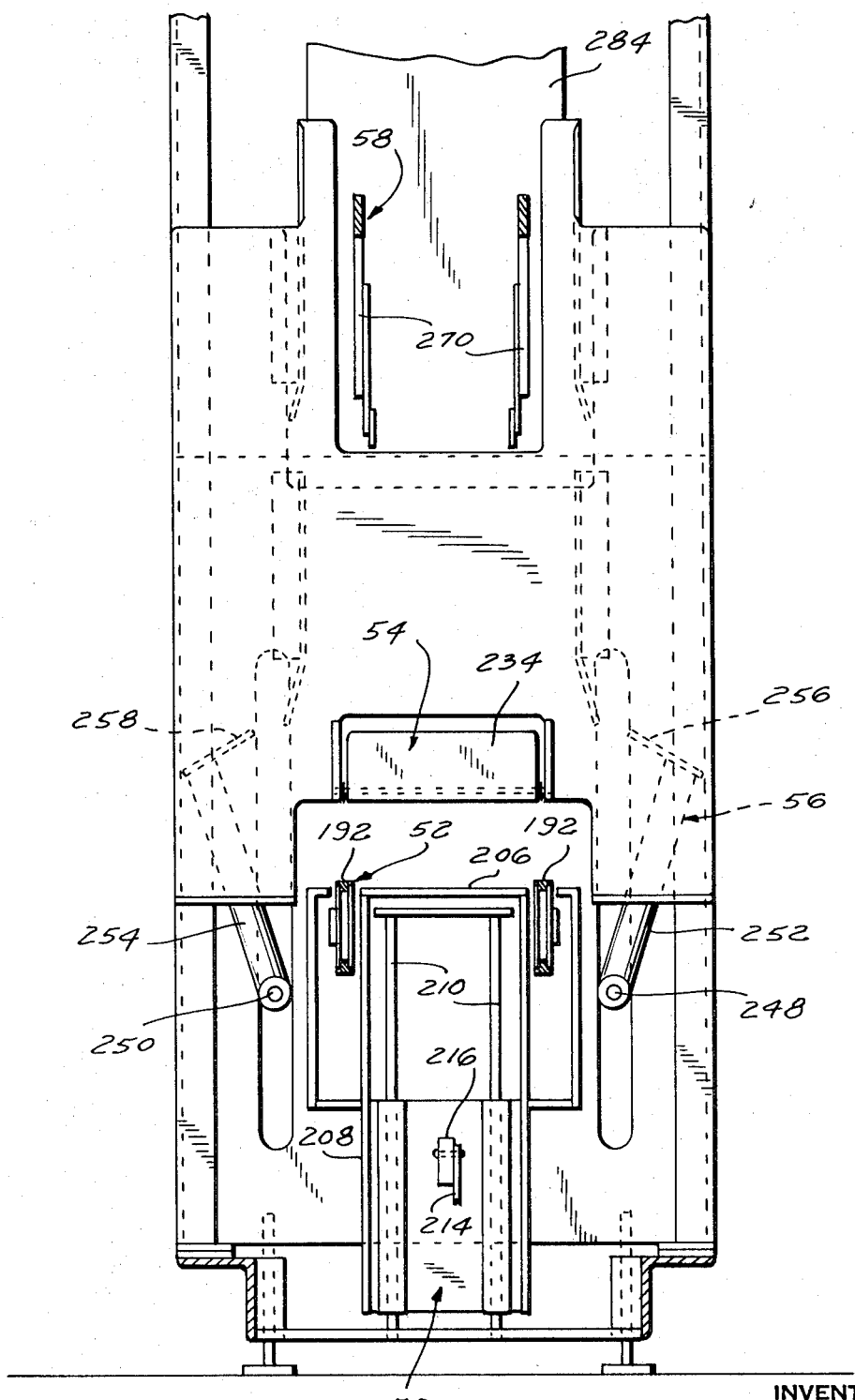
FIG. 8 is a front elevational view taken along the line 8—8 of FIG. 7.
Figure 9:
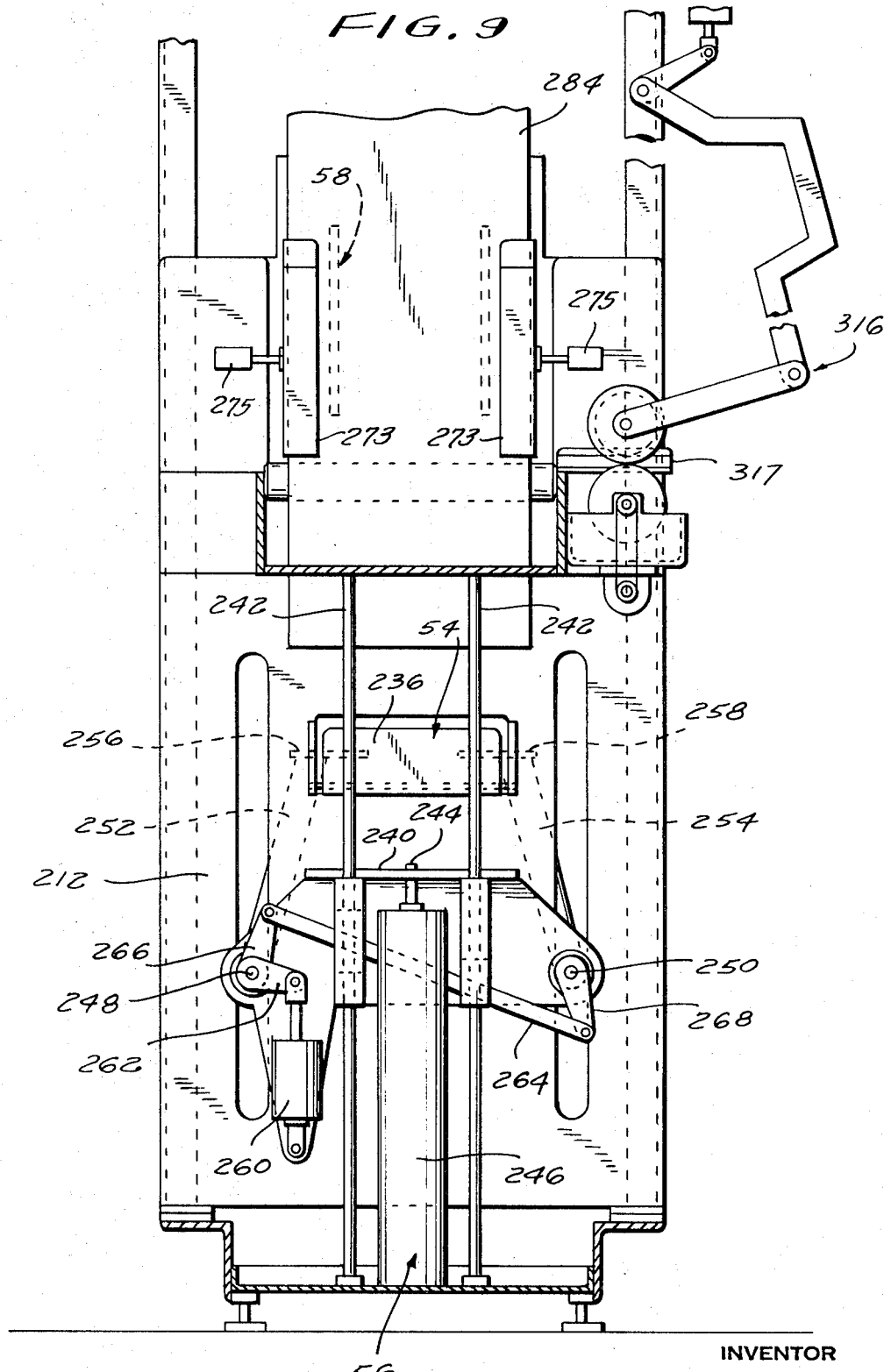
FIG. 9 is a rear elevational view taken along the line 9—9 of FIG. 7.
Figure 10:
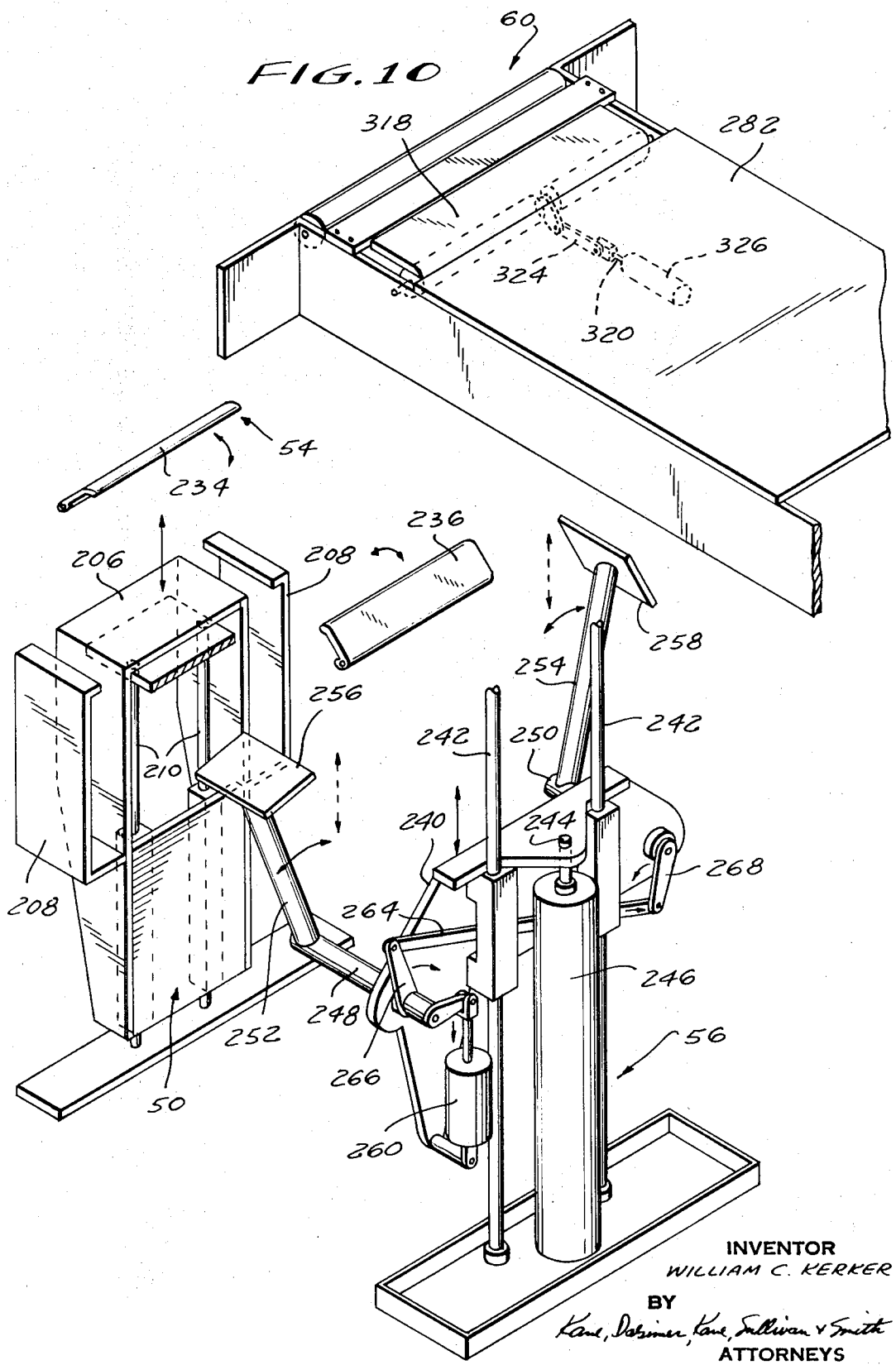
FIG. 10 is an enlarged fragmentary exploded and perspective view of the stack lifter, bundler lifter and bundle bander station.
Figure 11:
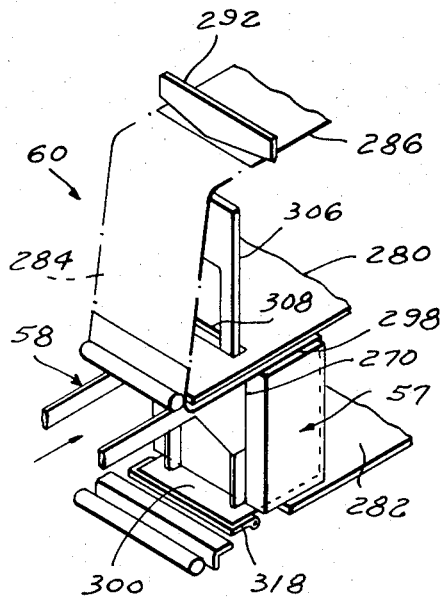
FIGS. 11, 12, 13 and 14 are fragmentary perspective views illustrating the sequence of steps involved in banding a bundle in accordance with one of the successful applications of this invention.

The stack elevator 50 receives the stacks 36 transferred by the second transfer belt conveyor 52 and operates to elevate each stack to the pivotal support mechanism 54 on which the elevated stacks are supported one above the other. As clearly viewed in FIGS. 7, 8 and 10, the trailing end of the transfer conveyor 52 is interdigitated with the stack elevator 50. The stack elevator 50 includes an interrupted stack-receiving platform 206 which is slightly below the conveying surface of the transfer belts 192. The platform 206 forms part of the stack elevator frame 208 which is adapted to shift vertically on the guide rods 210 which are suitably supported at both upper and bottom ends substantially as shown.

The transferred stack of bags 36 that travel on the belts 192 eventually impinge upon the substantially vertically extending wall 212 of the machine chassis following which the stack elevator is actuated. In this connection, the movement of the elevator 50 is synchronized with the movement of the pocket conveyor 44. This is accomplished by a linkage arrangement including link 214 pivotal at both ends to bracket 216 on one hand forming part of the elevator frame 208 and link 218 on the other. The other end of link 218 is fixed to one end of link 220 with this common connection being pivotal on fixed shaft 222. The other end of link 220 is pivotally connected with link 224 which is pivotally connected at its other end to arm 226. This arm is mounted at its other end fixed shaft 98 and conveniently mounts a cam follower 228 which is adapted to follow the slotted cam track of cam 230 keyed to shaft 84.

Thus, when a depression in the cam track is encountered, the arm 226 will pivot counterclockwise as viewed in FIG. 6 causing the arm or link 220 together with link 218 to pivot counterclockwise about fixed pivot 222. This pivotal motion will be transferred to linear motion of the elevator frame 208 through the link 214. Consequently the frame 208 will shift vertically on the guide rods 210 whereupon the stack 36 on belts 192 will be lifted by the platform 206 and eventually placed on the pivotal support mechanism 54.

PIVOTAL SUPPORT MECHANISM

The pivotal support mechanism 54 receives the stacks 36 elevated by the stack elevator 50 and maintains the stacks in a stacked relationship until such time as a predetermined number of stacks are supported thereon. According to usual practices in the trade, twenty stacks are selected for a bundle; and when twenty stacks are supported on the pivotal support mechanism 54, the bundle elevator 56 will be actuated to compress and, at the same time, raise the stack bundle 57. The pivotal support mechanism 54 is comprised essentially of a pair of pivotal plates 234 and 236 which are urged towards one another by means of a suitably applied spring bias and are adapted to pivot away from one another as the stacks 36 are elevated by the stack elevator 50. As the platform 206 is retracted downwardly, the plates 234 and 236 resume their inner position and, consequently, engage the lowermost bag of the elevated stack 36 thereon. This operation is continued until twenty stacks are accumulated on the arms 234 and 236 at which time the bundle elevator 56 is actuated to remove the stack bundle therefrom.

BUNDLE ELEVATOR

Following the placement of the twentieth stack on the pivotal support mechanism 54, the bundle elevator 56 is actuated to raise and, consequently, compress the bundle 57 whereupon the raised and compressed bundle is pushed to the banding station 60 by the pusher mechanism 58. The bundle elevator 56 comprises a vertically shiftable frame 240 which is guided vertically by means of the pair of vertically extending guide rods 242. The frame 240 is moved vertically as a result of its connection with the outer end of the piston rod 244 extended from cylinder 246 which may be either pneumatically or hydraulically actuated. Suitably journaled on the frame 240 are a pair of shafts 248 and 250 from which extend in a vertical direction a pair of arms 252 and 254, respectively. Pusher plates 256 and 258 are connected to the free ends of the respective arms 252 and 254. These plates are adapted to be shifted towards one another to engage the lower face of the lowermost bag supported on the pivotal support mechanism 54 when the frame 240 is shifted vertically.

Prior to the actuation of the piston in the cylinder 246 and consequent elevation of the frame 240, the arms 252 and 254 and their respective plates 256 and 258 are pivoted towards one another in order to engage the lowermost bag of the bundle. When the frame 240 is in a lowered position, the arms 252 and 254, together with their respective plates 256 and 258 are normally held in a divergent position in order not to hinder the operation of the stack elevator 50.

The other ends of the shafts 248 and 250 are movable simultaneously towards one another through the actuation of a piston-cylinder assembly 260 suitably bracketed to the frame 240. This cylinder may be either hydraulically or pneumatically actuated; and its piston rod is pivotally connected with arm 262 keyed with shaft 248. Both shafts 248 and 250 are adapted to move together through an interconnected linkage 264 pivotally connected with arms 266 and 268, respectively, also fixed to the shafts. Thus, when the piston rod is retracted, the interconnected linkage 264 will cause the arms 252 and 254 to shift towards one another and the respective plates 256 and 258 will be disposed between pivotal plates 234 and 236 beneath the lowermost bag supported on these pivotal plates. At this time, the cylinder 260 will be actuated to cause the frame 240 to raise and the plates 256 and 258 will raise the supported stacks to an elevated position to form the desired compressed bundle.

PUSHER MECHANISM

The compressed bundle will now be shifted to the banding station 60 upon the actuation of the pusher mechanism 58. As will be apparent to those skilled in the art, the actuation of the cylinders 246 and 260 may be triggered by a counting mechanism which in turn may be actuated by a switch associated with the wall 212 and which may be triggered by the presence of a stack 36 as it reaches the trailing end of the belt conveyor 52. On the other hand, this counting mechanism may be actuated by a complete rotation of one of the rotatable shafts of the drive system of FIG. 6.

The compressed bundle is shifted to the banding station 60 by the pusher mechanism 58 the actuation of which may be triggered by a switch which is closed following the raising of the bundle by the bundle elevator 56. The elevated and compressed bundle 57 is held momentarily at this position by the bundle elevator 56 until such time as the pusher mechanism 58 has had an opportunity to remove the compressed bundle and transfer it to the banding station 60. Following this transfer, the bundle elevator 56 is lowered to its retracted position. In essence, the pusher mechanism 58 includes a pair of bundle pusher plates 270 fixed to the free end of the suitably supported piston rod 272 extending from cylinder 274 which may be either pneumatically or hydraulically actuated while being bracketed to vertically adjustable support 276. After the pusher plate 270 has transferred the compressed bundle 57 to the banding station 60, it is retracted and ready for the next elevated compressed bundle.

The web 284 of the banding paper is guided into position by guides 273. These guides 273 are adapted to reciprocate outwardly through the actuation of the air cylinder assemblies 275 to permit the compressed bundle 57 to be shifted between plates 280 and 282 by the pusher 58. When the pusher 58 has retracted, the guides 273 are reciprocated back to their original position by the operation of the air cylinder assemblies 275 to thereafter guide the web 284 downwardly into position.

Figure 15:
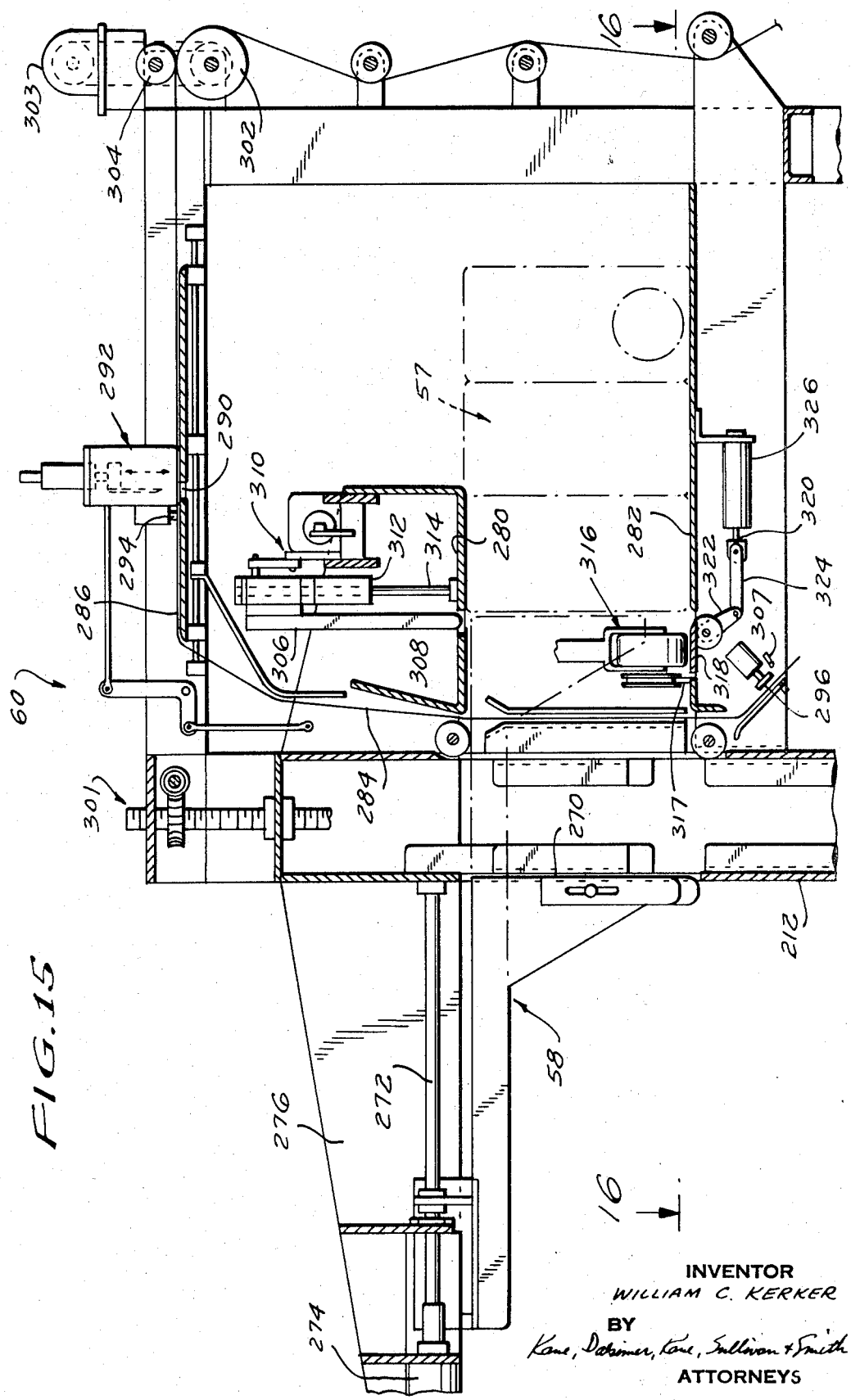
FIG. 15 is an enlarged elevational view of the bundle pusher and band supply and the bundle bundler.
Figure 16:
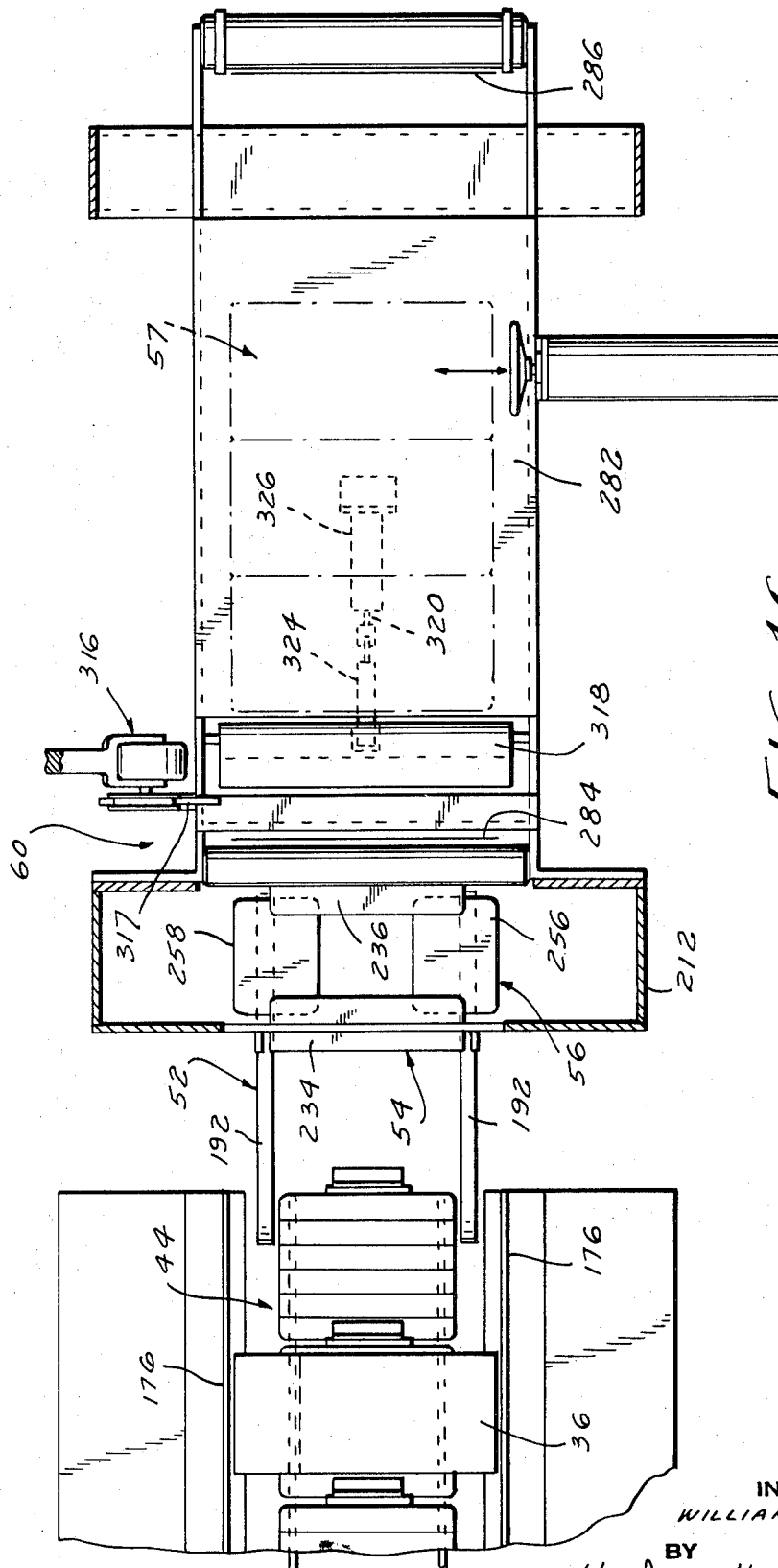
FIG. 16 is a top plan view taken along the line 16—16 of FIG. 15.
Figure 19:
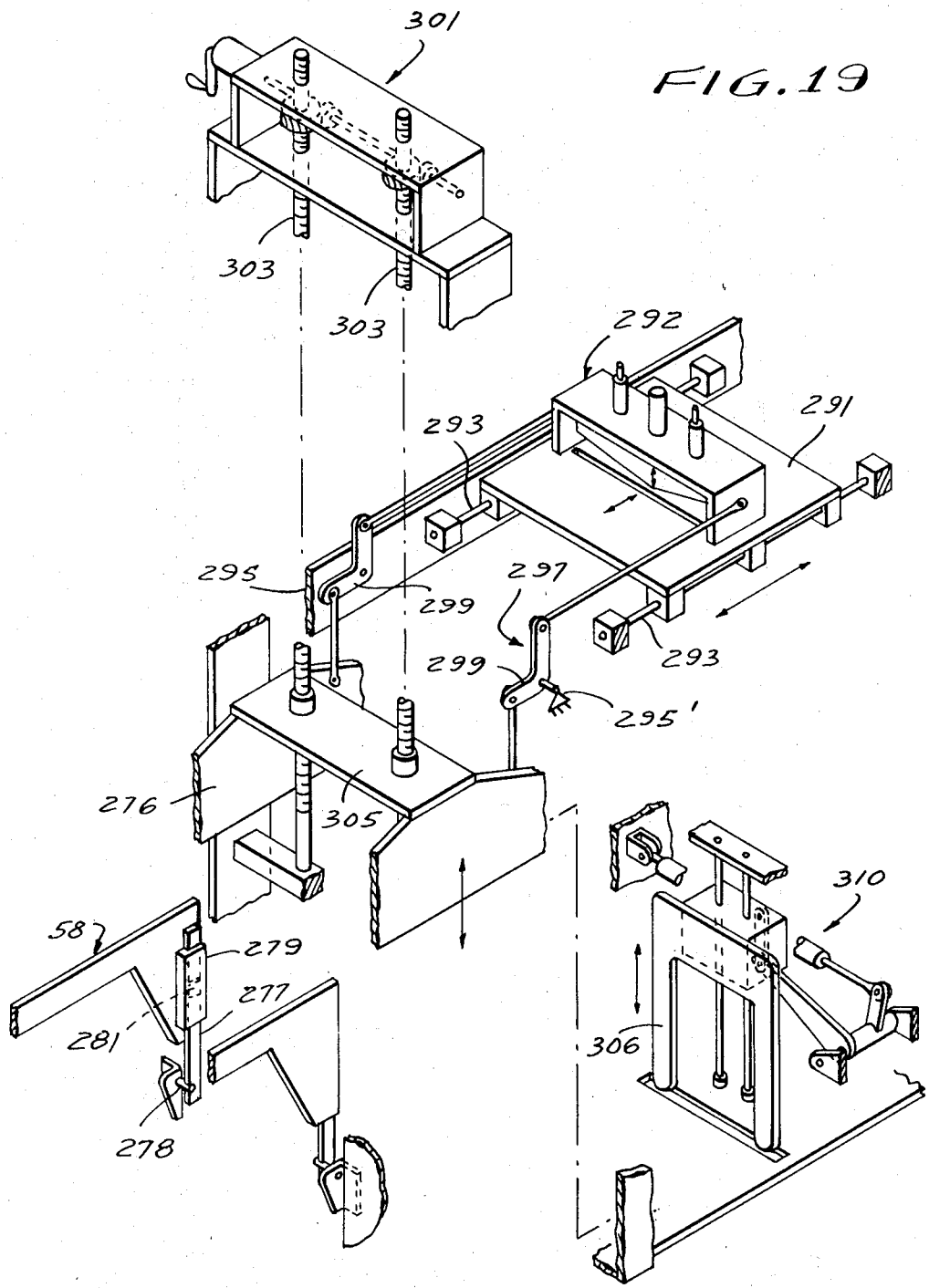
FIG. 19 is an exploded fragmentary perspective view showing the paper web knife adjustment and self-compensating pusher adjustment responsive to variations in bundle heights.

From time to time, the height of the compressed bundle 57 will vary depending on the nature of the paper or material from which the bags are formed. When this occurs, the throat clearance between plates 280 and 282 is preferably adjusted; and in accordance with the illustrated embodiment, plate 280 forming part of support 276 is raised or lowered, as the case may be, relative to plate 282 in a manner to be described in detail shortly. This adjustment is done when pusher 270 is in a retracted position, as shown in FIGS. 15 and 19. The bundle engaging forward face of each pusher is automatically changed with throat adjustment by providing a vertically shiftable pusher extension 277 the lower end of which is slotted and engageable with fixed inwardly extending pins 278 to thereby fix the elevation of this extension and assure its clearance of plate 282. The upper end of extension 277 is adapted to be shifted vertically relative to block 279 forming part of pusher 270. The block is slotted to accommodate the upper end of extension 277 and a suitable key means may be incorporated to permit this relative vertical movement and no undesirable transverse movements. A magnetic coupling 281 may also extend across block 279 and extension 277 to maintain the desired adjusted position of extension 277 in block 279.

BANDING STATION

At the banding station, the compressed bundle 57 is placed between a pair of spaced plates 280 and 282 at which time the bundle is partially banded by a length 284 of the selected banding material. This length of banding material is severed from the web 286 of banding material extending from a roll 288 or other suitable supply of this material. The web 286 is suitably guided from the roll 288 over a series of guide rolls and over top plate 280 which is provided with an opening 290 which cooperates with a suitably supported knife mechanism 292 in severing the length 284 from the web 286. The cut of the web 286 is completely across its width and this is accomplished by lowering a guillotin-type of knife by means of an air actuated cylinder. Simultaneously with the lowering of the knife by the air cylinder, a spring biased drag plate 294 is lowered to prevent the trailing end of the cut length 284 from falling. In addition, the leading end of the length 284 of web 286 is provided with a slight drag by means of the air cylinder actuated spring biased drag plate 296. Upon experiencing the impact of the compressed bundle 57 driven by the pusher mechanism 58, the ends of the length 284 will pull from the respective drag plates 284 and 286.

When plate 280 is raised and lowered by raising or lowering support 276, the location of knife mechanism 292 relative to the paper web 284 is adjusted to assure the desired length of web for the particular depth or height of bundle 57. Thus, the knife mechanism 292 is supported on a platform 291 shiftable on guide rails 293 inwardly of and bracketed to the stationary frame 295 of the machine, as shown in FIG. 19. Linkage 297 extends as shown between knife mechanism 292 and support 276 with bell crank 299 pivotal at its center by a fixed pivot extending from stationary frame 295. Thus, as support 276 is raised to increase the throat opening, linkage 297 shifts knife mechanism 292 to the right, as viewed in FIG. 15, to increase the web length 284 accordingly. When support 276 is lowered, the knife mechanism is shifted to the left to decrease the web length 284.

The support 276 may be raised or lowered automatically by sensing the height of the bundle 57 for a particular pressure or the pressure of the bundle for a particular height. On the other hand, the support 276 may be lowered either by a crank or motor operated worm 301 which serves to turn threaded shafts 303 and, thus, raise and lower platform 305 having tapped openings for meshing with the shafts as well as a fixed connection with supports 276.

When the compressed bundle 57 comes to rest between the plates 280 and 282, the length 284 will extend over the forward face of the bundle 57, over its top and bottom ends with the top trailing flap 298 and bottom trailing flap 300 extending rearwardly. The piston actuated drag plate 296 will be retracted together with the piston actuated drag plate 294 and cutter 292. The web drive roller 302 will now be actuated by motor 303 to drive the web 286 between the drive roller 302 and associated idler roll 304 to provide another predetermined length 284 of the web for cutting. The leading end of the web 284 trips an electric eye control 307 to determine the duration of operation of the web feeder roll 302.

Figure 12:
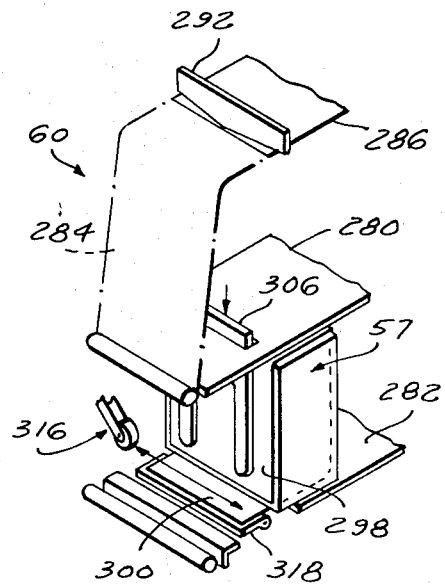

A top trailing flap folding plate 306 is shifted downwardly from its raised retracted position through opening 308 in plate 280 to fold the top trailing flap 298 downwardly against the rear face of the compressed bundle 57 (see FIG. 12). The downward movement of the plate 306 may be accomplished in one of a number of ways including the driven bell crank and linkage 309 of pneumatic piston-cylinder drive system 310 operable to lower and raise a sleeve 312 bracketed to plate 306 and guided in its movement while on the supported guide rod 314.

Figure 13:
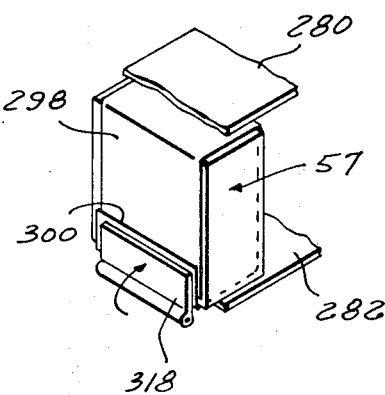
Figure 14:
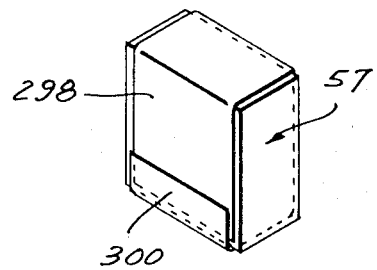

The rear bottom flap 300 is then folded upwardly over the outer and lower portion of the top trailing flap 298 either while the top trailing flap 298 is held downwardly by means of the folding plate 306 or during the retraction of this plate or at a point thereafter. In any event, the inner face of the lower trailing flap 300 has applied thereto a strip of glue or adhesive prior to folding this bottom trailing flap upwardly. In this connection, a motor driven glue-applying wheel assembly 316 is actuated laterally of the bottom trailing flap 300 and follows cam track 317 to apply a strip of adhesive by rolling action. Upon return of the glue-applying wheel of this assembly 316, the pivotal bottom trailing flap folding plate 318 is pivoted upwardly to force the bottom trailing flap 300 against the upper trailing flap 298 to cause these two flaps to be secured to one another by means of the interposed adhesive. The folding plate 318 is pivoted in a clockwise direction, as viewed in FIGS. 13 and 15, through the extension of a piston rod 320 coupled with arm 322 fixed for rotation with the plate 318 through the interposed link 324. The piston rod 320 extends from its cylinder 326 which may be either hydraulically or pneumatically actuated while being suitably bracketed to the machine frame as shown. After the pair of trailing flaps 298 and 300 have been adhesively secured to one another, the plate 318 is retracted.

The paper feed is started when gluer returns.

The cycle of operation at the banding station 60 may now be repeated. As the banded bundles 57 emerge from the banding station 60, they may now pass on to a wrapping station 62 at which the banded bundles are wrapped in the selected wrapping material either manually or automatically by machinery well-known in the trade.

BANDING STATION MODIFICATION

Figure 18:
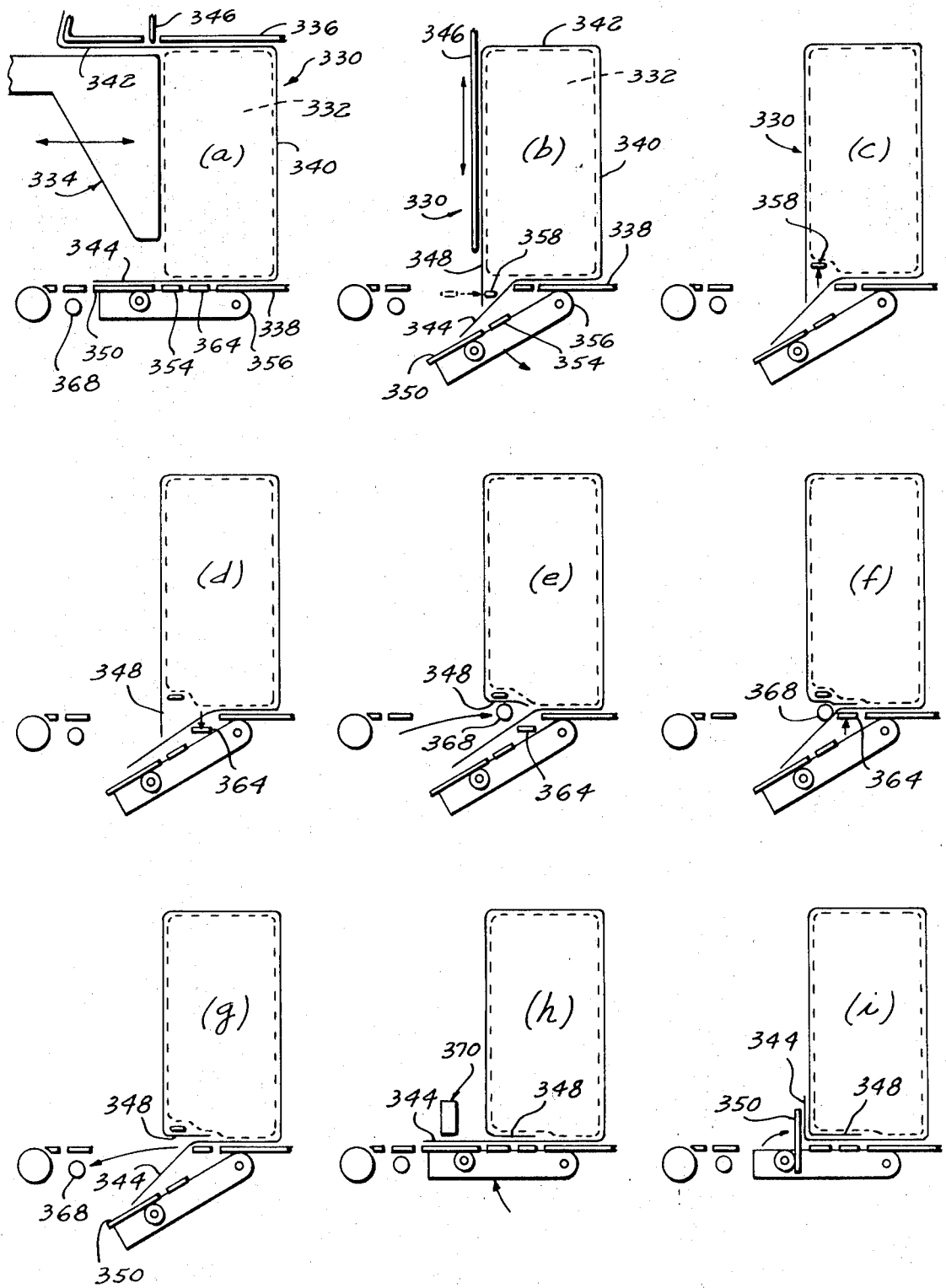
FIGS. 18a to i are fragmentary elevational views illustrating the series of sequential steps involved in forming a lock fold band about the compressed bundle by the apparatus of FIG. 17.

Referring now to FIG. 18, a banding station 330 may be incorporated into the previously described machine in place of the banding station 60 for purposes of executing a lock-fold banding operation automatically. As in the previous embodiment, the compressed bundle 332 will be pushed to the banding station 330 by means of the pusher mechanism 334 which may be the equivalent of pusher mechanism 58. Similarly, the compressed bundle 332 will be placed between an upper plate 336 and a lower plate 338 corresponding to previously described plates 280 and 282, respectively. The compressed bundle 332 will also have a length 340 of banding material extending across the front face of the bundle and top and bottom ends of the bundle with top trailing flap 342 and bottom trailing flap 344 extending rearwardly therefrom (see FIG. 18a).

The bottom trailing flap folding plate 350 will also pivot downwardly through the actuation of the air cylinder assembly 352. The free end of the piston of this assembly 352 is pivotally connected with plate 354 fixed to the pivotal arms 356 whereas the flap folding plate 350 is pivotally connected relative thereto. As shown, the trailing bottom flap 344 will bend downwardly as a result of the lowering of flap plate 350 (see FIG. 18b). Furthermore, swing fingers 358 will now be inserted beneath the bottom end of the compressed bundle 332 at the juncture between the bottom end and rear bundle face between the flap portion 348 and lower flap 344. The swing fingers 358 extend inwardly at each end of the bundle and are actuated by the air piston cylinder assembly 360 which is suitably bracketed to the machine chassis.

The swing fingers 358 are also pivotal in a horizontal plane prior to the folding downwardly of the upper trailing flap 342 by the folding plate 346. This pivotal motion may be accomplished by means of the piston air cylinder assembly 361 suitably bracketed to the machine chassis. In this manner, it will be assured that the projected swing fingers 358 will clear the bottom trailing flap 344.

The vertical folding or tucking plate 346 is lowered to fold the rear trailing flap 342 downwardly across the rear face of the compressed bundle 332 with a portion 348 extending below the bottom end of the bundle 332 for eventual folding against this bundle end. The vertical folding plate 346 will now be retracted. The construction and operation of the plate 346 parallels that of the previously described plate 306.

The inserted swing fingers 358 are raised slightly through the actuation of the suitably bracketed air piston cylinder assembly 362 (see FIG. 18c).

While the swing fingers 358 are raised, the table-locking plate 364 is lowered slightly as a result of the actuation of the suitably bracketed air piston cylinder assembly 366 (see FIG. 18d).

The lower portion 348 of the upper trailing flap 342 is folded forwardly against the bottom of the bundle 332 and the inserted portions of the swing fingers 358. This is accomplished by shifting forwardly tucking roller 368 rotatably mounted on the upper ends of arms 370 the upper end of which is secured to sleeve 372 rotatably mounted on the fixed shaft 374. An arm 376 is secured to sleeve 372 and is also pivotally connected with the free end of the piston rod of the air piston-cylinder assembly 378. Thus, retraction of the piston rod within the cylinder of the assembly 378 will cause the tucking roller to pivot clockwise as viewed in FIG. 17 about the fixed pivot 370 thereby folding the flap portion 348 forwardly and beneath the bottom of the compressed bundle 332 and the swing fingers 358 (see FIG. 18e). The folding flap portion 348 will ultimately form the locking flap.

The locking plate 364 is then raised by the air piston cylinder 366 to hold the end of the lock flap 348 between the adjacent surfaces of the banding material and lower bag of the bundle 332 (see FIG. 18f).

The tucking roller 368 is now retracted by means of the air piston cylinder assembly 378 which causes the arms 370 to pivot in a counterclockwise direction about shaft 374 (see FIG. 18g).

The swing fingers 358 are removed by means of air piston cylinder assembly 360 and thereafter lowered by means of the air piston-cylinder assembly 362. On the removal of the swing fingers 358, the bundle 332 will swing tightly against the entire inner face of the locking flap 348. The plate 350 is now pivoted outwardly by the air piston-cylinder assembly 352 to cause the entire exposed face of the locking flap 348 to be engaged by inner surfaces of the banding material. The selected pattern of paste is now applied by a suitable glue applying mechanism 370 which may assume the form of the previously disclosed glue applicator 316 (see FIG. 18h).

Figure 17:
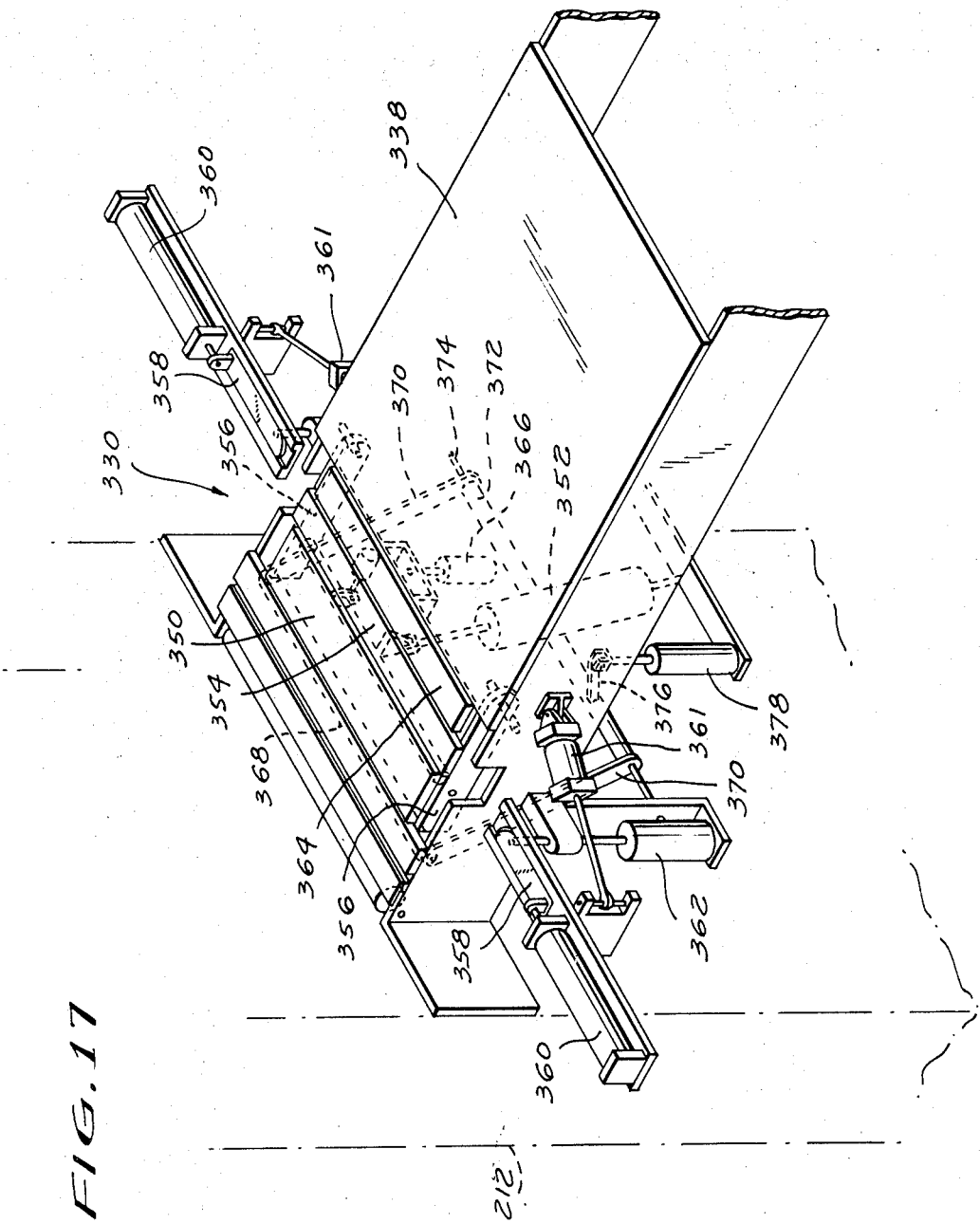
FIG. 17 is a perspective view of a modified bander for lock folding the band about the compressed bundle.

Following the application of the selected pattern of glue to the inner surfaces of the bottom trailing flap 344, the flap folding plate 350 is pivoted in a clockwise direction as viewed in FIG. 17 and FIG. 18i to fold the bottom trailing flap 344 into engagement with the top flap 342 to secure these flaps to one another by means of the interposed adhesive. In this manner, a band is applied to a compressed bundle in which a double lock fold is incorporated into the banding construction which will doubly assure the desired compressed condition of the bundle 332 (see FIG. 18i). Thereafter the flap folding plate 350 is returned to its original position at which it is adapted to have transported thereover the next compressed bundle 332.

Following retraction of the swing fingers 358, they may be pivoted at an angle to the direction of travel of the bundles 332 by actuation of the piston air cylinder assembly 361 either prior to or subsequent to the lowering of the swing fingers 358 by means of the piston air cylinder assembly 362.

SUMMARY

Thus, it will now be evident that an apparatus is provided for automatically stacking bags received from the discharge end of a bag-making machine for subsequent conveyance to a banding station in the form of a bundle of stacks of bags that are compressed for purposes of assuming a minimum amount of space. Thereafter, the compressed bundle is banded by simply overlapping and adhesively securing the marginal ends of the banding material or by incorporating therein an additional lockfold for assuring the desired compressed condition of the bundle. In accordance with a successful embodiment of the invention, approximately one bundle was banded per minute and the banding machine was capable of taking care of the output of one paper bag-making machine.

Thus, the several aforenoted objects and advantages are most effectively attained. Although several somewhat preferred embodiments of this invention have been disclosed and described in detail herein, it should be understood that this invention is in no sense limited thereby and its scope is to be determined by that of the appended claims.

I claim:
1. A bundle banding machine comprising:
   a stacker for stacking a predetermined number of substantially flat product into a stack including lifter means for transferring each of the stacks to a first location;
   a turntable at said first location for receiving each of the stacks transferred by the lifter means and then turning each stack to a predetermined orientation for bundling;
   a pusher mechanism for transferring each of the predeterminately oriented stacks from the turntable to a second location;
   a first transfer belt conveyor at the second location for receiving each of the stacks transferred by the pusher mechanism and then transferring each stack to a third location;
   a pocket conveyor having a leading end at the third location for receiving each of the stacks transferred by the first transfer belt conveyor and then transferring each stack to a fourth location;
   a second transfer belt conveyor at the fourth location for receiving each of the stacks and then transferring each stack to a fourth location;
   a stack elevator at the fourth location for receiving at a lowered position each of the stacks transferred by the second transfer belt and lifting each stack to an elevated fifth position;
   a support mechanism at the elevated fifth position for receiving each of the stacks elevated by the stack elevator and supporting the elevated stacks in a stacked relationship for forming a bundle of a predetermined number of the stacks;
   a bundle elevator for elevating at least the lowermost stack of each bundle off of the support mechanism and compressing the bundle at an elevated sixth position;
   a pusher mechanism at the sixth position for transferring the compressed bundle to a banding station; and
   banding means at the banding station for banding the compressed bundle.

2. The invention in accordance with claim 1 wherein the banding machine is designed to receive the product directly from the product making machine and stripping means interposed between the stacker and the product making machine for stripping the product as it is made and directing it onto the stacker.

3. The invention in accordance with claim 2 wherein the product is a bag having a bottom and an open top and the product making machine is a bag-making machine and the turntable is operative to have alternate stacks with their tops and bottoms facing in the same direction but different from the adjacent stacks.

4. The invention in accordance with claim 1 wherein the lifter means includes a plate on which the stack is formed; means for isolating the stack from subsequent bags, and the stacker further includes means for receiving and supporting the individual flat product of the subsequent stack as the lifter means transfers a stack to the first location and camming means for altering the path of travel of the plate during the return travel of the plate from the first location in order that the plate will clear the product of the subsequent stack.

5. The invention in accordance with claim 4 wherein the camming means is pivotal from one location during the course of travel of the plate to the first location to a different position during the return of the plate from the first location and cam follower means associated with the plate for following the contour of the camming means.

6. The invention in accordance with claim 1 wherein drive means are associated with the first conveyor and the pocket conveyor for intermittently operating these conveyors.

7. The invention in accordance with claim 1 wherein the pocket conveyor includes means for defining a pocket of sufficient size to receive a stack of the product, and spring means associated with each pocket for assuring the desired stack relationship of the product.

8. The invention in accordance with claim 1 wherein the support mechanism includes a pair of pivotal plates spaced from one another, biasing means for urging the plates towards one another to an elevated stack supporting position, said plates defining means for supporting the elevated stacks thereon and said stack elevator means adapted to travel between the pivotal plates during elevation of a stack of the product to cause the stack on the elevator to cause the plates to pivot away from one another and when the stack is beyond the plates, the plates are adapted to return to the stack supporting position at which the elevated stack is adapted to be supported thereby.

9. The invention in accordance with claim 1 wherein the banding means includes a web of banding material, cutting means for cutting a predetermined length of the web, and means for applying the length of web about the compressed bundle with the ends of the length of web arranged in overlapping relationship and glue applying means for applying glue to the length of web along a location interposed between the overlapping ends in order that the length of web will band and maintain the bundle in the compressed condition.

10. The invention in accordance with claim 9 wherein the banding means includes drag means for maintaining the length of web in a slightly taut position and means for directing the pusher mechanism towards the taut length of web whereby the compressed bundle is adapted to be driven into the taut length of web to initiate the folding of the length of web about the compressed bundle.

11. The invention in accordance with claim 9 wherein the pusher mechanism is adapted to drive a compressed bundle into the length of web to initiate the folding of the length of web about the compressed bundle at the banding station whereby the length will be applied over the front face and top and bottom ends of the compressed bundle with the length of web having rearwardly extending top and bottom trailing flaps, a reciprocal plate for folding downwardly about the rear face of the compressed bundle the top trailing flap of the length of web and a pivotal plate for thereafter folding the bottom trailing flap over the top trailing flap to complete the banding of the compressed bundle and a glue applying mechanism for applying glue to inner faces of the lower trailing flap prior to its folding over the top trailing flap.

12. The invention in accordance with claim 11 wherein the banding means includes lock folding means for interposing the end of the top trailing flap between the bottom end of the compressed bundle and opposed surfaces of the length of web prior to bonding the lower trailing flap to the top trailing flap along the rear face of the compressed bundle.

13. The invention in accordance with claim 12 wherein means are included for lowering the pivotal plate prior to folding of the top and bottom trailing flaps, means are provided for inserting fingers between the bottom end of the compressed bundle and the adjacent surfaces of the length of web at the corner between the bottom end of the compressed bundle and the rear face of the compressed bundle, means for raising the finger to thereby raise the compressed bundle adjacent the corner between the bottom end of the compressed bundle and its rear face and means for maintaining the finger in this raised position, the top trailing flap folding plate being operative to fold the top trailing flap downwardly across the rear face of the compressed bundle as the finger is raised, reciprocal bar means for reciprocating to fold the terminal end of the top trailing flap over the raised finger between the raised bottom end portions of the compressed bundle and opposed surfaces of the length web, holding means for holding the end of the trailing top flap after it is folded between the raised bottom end portions of the compressed bundle and opposed surfaces of the length of web, means for removing the raised finger while the end of the top trailing flap is held by the holding means to force the raised bottom end portions of the compressed bundle into engagement with the opposed surfaces of the terminal end of the top trailing flap, means for raising the pivotal plate after the terminal end of the top trailing flap is interposed between the bottom end of the compressed bundle and opposed surfaces of the length of web and the glue application means and then the pivotal plate operates to fold the bottom trailing flap into engagement with the top trailing flap with the interposed glue adhesively securing the flaps to one another to maintain the bundle in a banded compressed condition.

14. A bundle banding machine comprising:
means for directing a compressed bundle to a banding station; and
banding means at the banding station for banding the compressed bundle, means for supplying a web of the banding material, cutting means for cutting a predetermined length of the web of banding material, means for initially applying the length of web about the front face of the compressed bundle and top and bottom ends of the compressed bundle with top and bottom trailing flaps extending rearwardly of the bundle, a reciprocal plate for folding downwardly about the rear face of the compressed bundle the top trailing flap of the length of web and a pivotal plate for thereafter folding the bottom trailing flap over the top trailing flap to complete the banding of the compressed bundle and a glue applying mechanism for applying glue to inner faces of the lower trailing flap prior to its folding over the top trailing flap, banding means includes lock folding means for interposing the end of the top trailing flap between the bottom end of the compressed bundle and opposed surfaces of the length of web prior to bonding the lower trailing flap to the top trailing flap along the rear face of the compressed bundle, means for lowering the pivotal plate prior to folding of the top and bottom trailing flaps, means for inserting fingers between the bottom end of the compressed bundle and the adjacent surfaces of the length of web at the corner between the bottom end of the compressed bundle and the rear face of the compressed bundle, means for raising the finger to thereby raise the compressed bundle adjacent the corner between the bottom end of the compressed bundle and its rear face and means for maintaining the finger in this raised position, the top trailing flap folding plate being operative to fold the top trailing flap downwardly across the rear face of the compressed bundle as the finger is raised, reciprocal bar means for reciprocating to fold the terminal end of the top trailing flap over the raised finger between the raised bottom end portions of the compressed bundle and opposed surfaces of the length of web, holding means for holding the end of the top trailing flap after it is folded between the raised bottom end portions of the compressed bundle and opposed surfaces of the length of web, means for removing the raised finger while the end of the top trailing flap is held by the holding means to force the raised bottom end portions of the compressed bundle into engagement with the opposed surfaces of the terminal end of the top trailing flap, means for raising the pivotal plate after the terminal end of the top trailing flap is interposed between the bottom end of the compressed bundle and opposed surfaces of the length of web and the glue application means and then the pivotal plate operates to fold the bottom trailing flap into engagement with the top trailing flaps with the interposed glue adhesively securing the flaps to one another to maintain the bundle in a banded compressed condition.

15. The invention in accordance with claim 14 wherein the finger is adapted to be moved towards and away from the bundle and is adapted to be raised and lowered towards the bottom end of the bundle and also pivotal towards and away from the bundle, means for extending the finger towards the compressed bundle prior to placing the finger between the bottom end of the bundle and opposed surfaces of the length of web, means for pivoting the extended finger from a position away from the bundle towards a position between the bottom end of the compressed bundle and the opposed surfaces of the length of web and means for raising and lowering the finger and raising the finger into engagement with the bottom end of the compressed bundle.

References Cited

UNITED STATES PATENTS

| | | | |
|---|---|---|---|
| RE. 8,292 | 6/1878 | Dederick | 53—124 |
| 480,967 | 8/1892 | Sabold | 53—124 |
| 1,204,118 | 11/1916 | Batdorf | 53—124 |
| 1,261,612 | 4/1918 | Powers | 53—124 |
| 1,659,313 | 2/1928 | Cranston | 53—124 |
| 2,087,704 | 7/1937 | Potdevin | 93—93 |
| 2,653,431 | 9/1953 | Robinson | 53—124 |
| 2,729,151 | 1/1956 | Evers | 93—93 |
| 2,751,731 | 6/1956 | Evers | 53—124 |
| 2,768,489 | 10/1956 | Brown | 53—124 |
| 3,019,886 | 2/1962 | Winkler | 93—93 |
| 3,172,342 | 3/1965 | Potdevin | 93—93 |
| 3,261,141 | 7/1966 | Hyer | 53—124 |
| 3,343,334 | 9/1967 | Bode | 53—124 |
| 3,354,600 | 11/1967 | Hoffmann | 53—124X |
| 3,490,198 | 1/1970 | Beckman | 53—64 |

FOREIGN PATENTS

| | | |
|---|---|---|
| 627,325 | 9/1961 | Canada. |
| 886,570 | 1/1962 | Great Britain. |

WAYNE A. MORSE, Jr., Primary Examiner

U.S. Cl. X.R.

53—176; 93—93